Feb. 8, 1927. Re. 16,546
F. PARKER
MEANS FOR WAVING HAIR
Original Filed Aug. 31, 1925
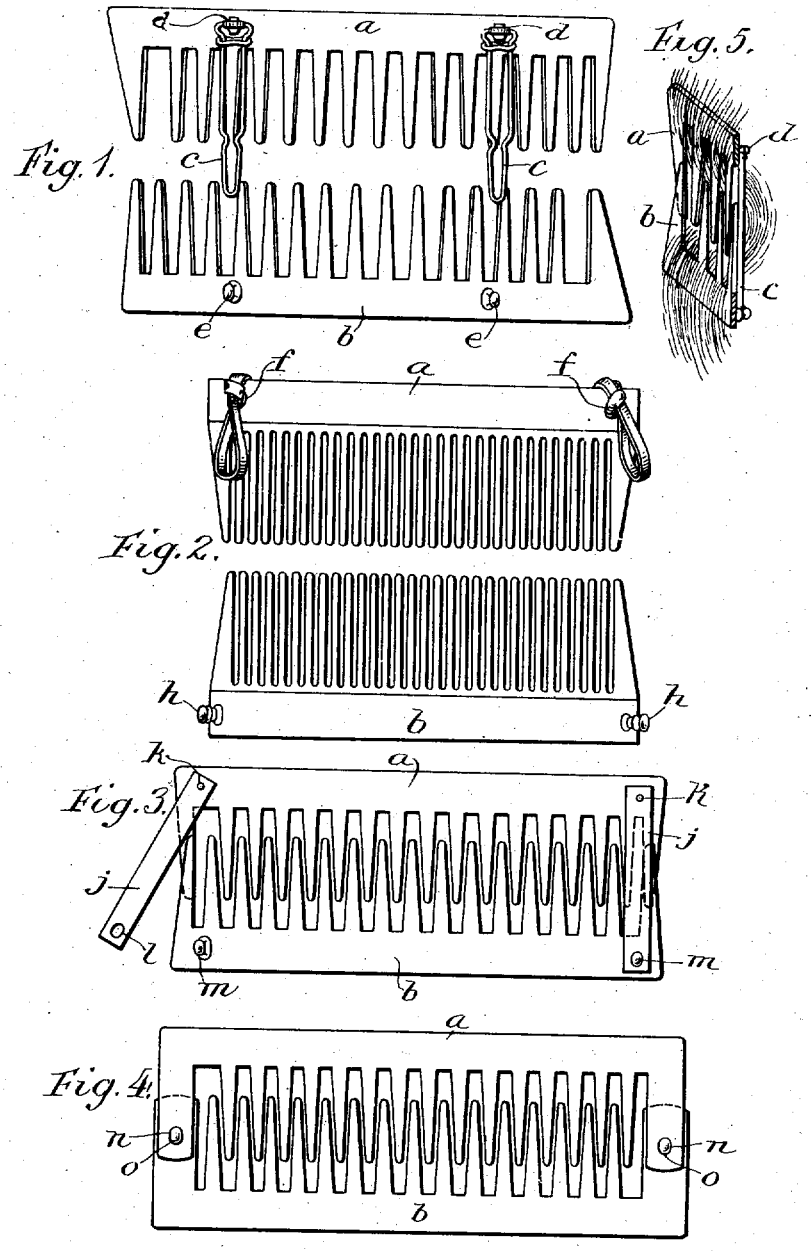
INVENTOR
Frederick Parker
BY
Rogers, Kennedy & Campbell,
ATTORNEYS.

Reissued Feb. 8, 1927.

Re. 16,546

UNITED STATES PATENT OFFICE.

FREDERICK PARKER, OF LONDON, ENGLAND, ASSIGNOR TO PARKER AND COMPANY (LONDON) LIMITED, OF LONDON, ENGLAND.

MEANS FOR WAVING HAIR.

Original No. 1,577,488, dated March 23, 1926, Serial No. 53,678, filed August 31, 1925. Application for reissue filed November 27, 1926. Serial No. 151,230.

This invention relates to a novel hair waving means as will be described, involving intermeshing combs, and is specifically directed to improved means for holding together the combs after having been applied in intermeshing relation. According to this invention the two combs are provided with positive interconnecting means, i. e. not depending on mere friction to resist separation, as would be the case with a proposed use of mere prongs and sockets for the purpose. The combs hereof may be provided with two or more fastening members each engaged with one comb and engaged or adapted to engage corresponding means on the other comb.

The fastening members or connections, extending across from one comb to the other, may be formed of spring or any other suitable material and may be of the type ordinarily used to secure the hair in hair slides, or they may consist of elastic elements or rubber bands, or one comb may be provided with arms, either pivoted or fixed having apertures adapted to engage pins or studs on the other comb, which pins may be on the end pieces or sides of the comb.

To wave hair, the combs are inserted oppositely in the hair whilst it is damp, one up and one down, teeth facing teeth, in opposition, and are relatively drawn together into meshing engagement, to confine a portion of the hair in waved condition, and are there held connected to one another. They are allowed to remain there until the hair is perfectly dry.

The invention is illustrated in the accompanying drawings in which Figures 1 to 4 show in exterior face view various forms of combs constructed in accordance with this invention. Figure 5 is a sectional perspective view of the embodiment of Figure 1 with the combs in position, confining a portion of the hair in waved condition.

In each figure of the drawings *a* and *b* are the two toothed members or combs.

Referring to Figure 1 there is shown a holding means comprising two fastening devices, each consisting of a spring clip *c* hinged at *d* to the comb *a* and apertured to engage a stude *e* on the comb *b* when in position. This structure illustrates my preferred combination wherein relative play or swing is permitted due to the swingable or loose attachment of the connecting device to the combs, thus avoiding rigidity, and giving flexibility of action and self adjustability of the combs when in place, this advantage also pertaining to Fig. 2.

In Figure 2 the comb *a* has holes *f* through which pass elastic elements or rubber bands *g* that are used in place of the clips shown in Figure 1, and operate by pulling force to hold the combs in their drawn together position. When the combs are in position the rubber bands *g* are engaged upon studs *h* on the comb *b*. This structure gives swing, flexibility and relative self adjustment between the two combs, and holds them drawn together as closely as permitted by the quantity of hair engaged.

In Figure 3 the fastening device consists of arms *j* pivoted at *k* to comb *a*. The swinging ends of the arms *j* are provided with holes *l* which can engage upon spring studs *m* on the comb *b*. As with Figures 1 and 2 the holding means is located at the exterior side of the combs and does not interfere with the manipulation of the combs in applying them to the hair.

In Figure 4 the extreme end teeth of the comb *a* have holes *n* that engage studs *o* on the end teeth of the comb *b*. As in Figure 1 the engagement is by a movement transverse to the plane of the combs. In all embodiments the combs are separate structures and bodily separable except as restrained by the connecting means.

Figure 5 shows the combs *a* and *b* as in Figure 1 in position on the hair when applied as already described. The hair is formed into a distinct wave, extending under the back of one comb, outwardly or to the right, and returning under the back of the other comb.

There has thus been described a hair waving means or comb embodying the principles and attaining the objects of the present invention. The several matters of combination, arrangement, design and detail illustrated in the drawings may be variously modified without departing from the principles and therefore the invention is not intended to be limited to such matters except so far as set forth in the appended claims.

What I claim is:

1. A hair waving comb comprising two bodily separable toothed members of substantially the same size and shape with the teeth of one member intermeshing with the teeth of the companion member, one of said members carrying hinged fastening devices near its opposite end portions and the other member carrying studs with which said fastening devices engage.

2. A hair waving comb comprising two bodily separable toothed members of substantially the same length and with the teeth of one member adapted to intermesh with the teeth of the other member, and a plurality of fastening devices each swingingly mounted on one of said members and engaging with a complementary device on the other member.

3. A hair waving comb comprising two bodily separable toothed members of substantially the same length with the teeth of one member intermeshing with the teeth of the companion member, said members carrying one or more fastening devices each consisting of an apertured part on one member and a complementary part on the other member with which said apertured part engages by a movement transverse to the plane of the comb.

4. A hair waving comb comprising two complementary toothed members of substantially the same length with the teeth of one member intermeshing with the teeth of the companion member, and means holding the two members in their intermeshing engagement consisting of a plurality of swingable fastening devices each extending across from one member to the other.

5. A hair waving comb comprising complementary toothed members adapted to be engaged oppositely in the hair, with teeth facing teeth, and then relatively drawn together to confine a portion of the hair in waved condition, and means holding the toothed members in their drawn together position consisting of connections extending across from one member to the other at the exterior side thereof.

6. A hair waving comb comprising complementary toothed members adapted to be engaged oppositely in the hair and drawn together to confine a portion of the hair in waved condition, and means holding the toothed members in such position consisting of devices extending across from one member to the other and connected thereto in a manner to allow relative play or swing.

7. A hair waving comb comprising complementary toothed members adapted to be engaged oppositely in the hair with teeth facing teeth and relatively drawn together to confine a portion of the hair in waved condition, and means holding the toothed members in operative position consisting of elastic elements extending across from one member to the other.

In testimony that I claim the foregoing as my invention I have signed my name this 5th day of November, 1926.

FREDERICK PARKER.